J. JOHNSTON.
HEATING DEVICE.
APPLICATION FILED NOV. 11, 1919.
1,432,864.
Patented Oct. 24, 1922.
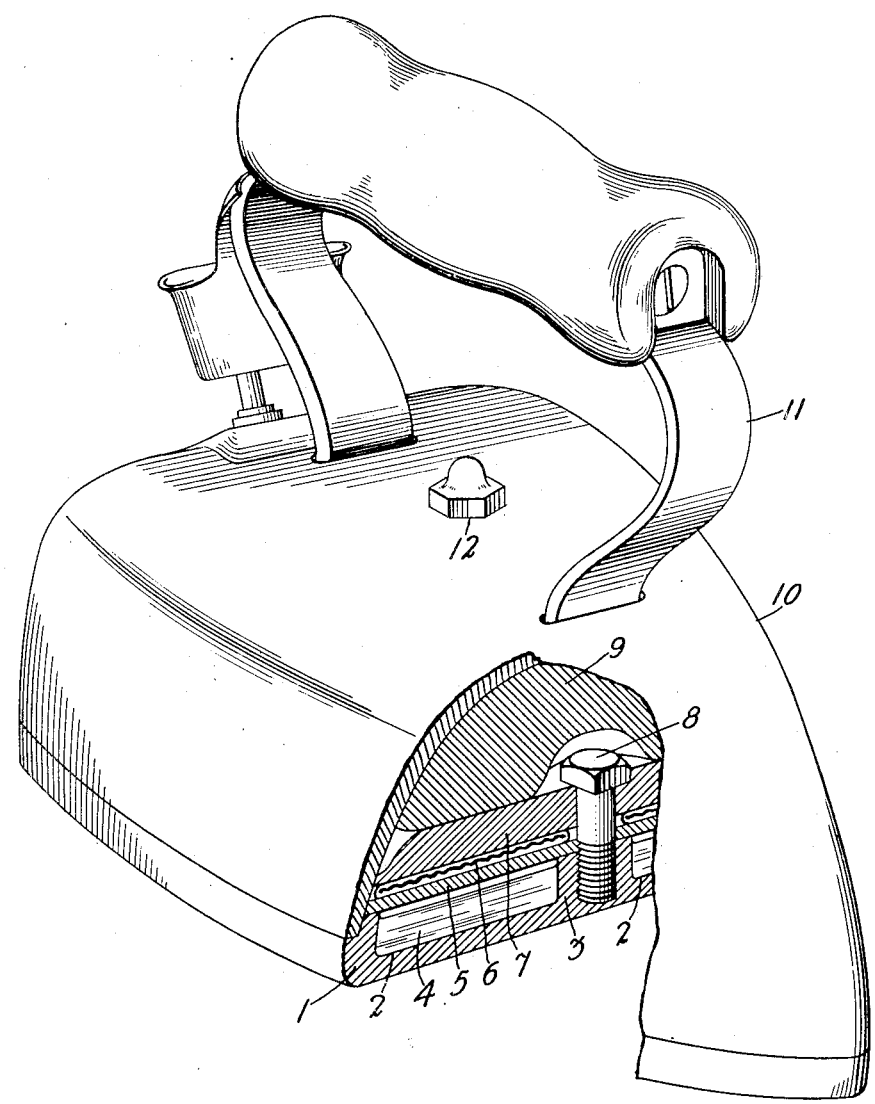
Inventor:
John Johnston.
by Hubert A Pattison
Atty.

Patented Oct. 24, 1922.

1,432,864

UNITED STATES PATENT OFFICE.

JOHN JOHNSTON, OF NEW HAVEN, CONNECTICUT, ASSIGNOR TO WESTERN ELECTRIC COMPANY, INCORPORATED, OF NEW YORK, N. Y., A CORPORATION OF NEW YORK.

HEATING DEVICE.

Application filed November 11, 1919. Serial No. 337,119.

*To all whom it may concern:*

Be it known that I, JOHN JOHNSTON, a citizen of the United States, residing at New Haven, in the county of New Haven, State of Connecticut, have invented certain new and useful Improvements in Heating Devices, of which the following is a full, clear, concise, and exact description.

This invention relates to improvements in heating devices in which the so-called latent heat of fusion or of vaporization is utilized as a heat reservoir which enables the device to yield a predetermined quantity of heat within a narrow temperature range.

In the embodiment of the present invention, a heating device is provided with a reservoir containing any suitable substance which melts, or vaporizes, within the range of temperatures to which the heating device is subjected in use. Where a solid substance is employed and the device is heated slowly, its temperature will rise until the substance begins to melt, whereupon the temperature will remain more or less constant until enough heat has been supplied to melt substantially all of the substance; when this has happened, the device is capable of yielding, while the substance freezes again, a relatively large supply of heat at a substantially constant temperature. Where a fluid substance is employed and the device is heated slowly, its temperature will rise until the substance begins to vaporize, whereupon the temperature will increase relatively slowly until enough heat has been supplied to vaporize substantially all of the substance; when this has happened, the device is capable of yielding, while the substance condenses again, a relatively large supply of heat within a narrow temperature range. Moreover, if the amount of heat supplied is roughly adjusted in such a way that the substance is partly melted and partly frozen, or partly vaporized and partly fluid, the device is capable of yielding fluctuating quantities of heat at a substantially constant temperature.

The present improvement may be employed to advantage in heating appliances of all kinds, particularly when an approximately constant temperature is desirable, irrespective of what the heating agent may be. For simplicity of illustration, the invention is shown in the drawing as embodied in an electric flat-iron, in which 1 represents the base of the iron which is of the usual construction except that instead of being a thick plate of metal, the base is hollowed out over its entire upper surface to form a reservoir 2; two upstanding lugs, however, being left, one of which is illustrated at 3, to provide a means for securing the various elements of the iron together. A member 4 of tin, which constitutes the substance whose latent heat is utilized, is placed within the reservoir 2 and held in position by means of a retaining plate 5, against the upper surface of which an electric heating element 6 is positioned. A member 7, constructed of iron, is placed above the electric heating element 6 and the member 7, the heating element 6 and the retaining plate 5 are all secured together and to the base 1 by means of a bolt 8 passing through aligned openings therein and screwed within an opening formed in the lug 3. A second member 9 is suitably secured to a cover 10 which also carries a handle 11. The cover 10 and member 9 are secured to the base 1 by a bolt 12 which passes through these elements and also through the member 7, heating element 6 and retaining plate 5 and is screwed into an opening formed in the other lug 3 (not shown).

In the foregoing description, tin has been selected as the substance merely for illustrative purposes, but it is understood that any substance may be employed, the selection being determined in each case by the temperature range within which it is desired to utilize the supply of heat yielded by the freezing of the substance. In most of the ordinary types of heating devices, such as flat-irons, stove-plates, hot plates, radiators for fireless cookers, etc., it is probable that the most suitable materials in practice would be metals of relatively low melting point, although any appropriate substance, or mixture of substances, may be selected. Approximate data for the metals apparently best suited to this purpose are given in the following table:

| Metal. | Freezing temperature centigrade. | Density approx. | Heat evolved on freezing. | |
|---|---|---|---|---|
| | | | Calories per gram. | Calories per cc. |
| Tin | 232 | 7.3 | 14.0 | 100 |
| Bismuth | 271 | 9.8 | 12.5 | 120 |
| Cadmium | 321 | 8.6 | 13.7 | 120 |
| Lead | 327 | 11.3 | 5.4 | 60 |
| Zinc | 419 | 7.1 | 28 | 200 |

Other freezing temperatures may be secured by using eutectic mixtures of these, or other metals; for instance, the eutectic mixture of cadmium and bismuth, which contains about 60% bismuth, would yield about 120 calories per cubic centimeter when it freezes at 140°. Other mixtures of metals will yield other ranges of temperature during the process of freezing.

In like manner, the heat of vaporization can be utilized, in which case the temperature range, within which the heat of condensation of a vapor is made available, can by appropriate design be varied within fairly wide limits. The most likely substance for use in this way appears to be mercury, approximate data for which at several temperatures follow:

| Temperature degree centigrade. | Vapor pressure atmospheres. | Heat evolved on condensation calories atmospheres vapor. |
|---|---|---|
| 360 | 1 | 0.25 |
| 400 | 2 | 0.5 |
| 450 | 4.1 | 1 |
| 500 | 7.8 | 2 |

Many heating devices and appliances, as at present constructed, yield a supply of heat adequate for work in hand only when they have been heated to a temperature considerably higher than the temperature really needed for the work. On the other hand, since heating devices embodying the present invention yield a relatively large supply of heat within a narrow temperature range which, by appropriate selection of material, can be the range best suited to the work in hand, the initial temperatures of the heating device need not be so high; consequently, there will be less rapid corrosion of the heating apparatus and a smaller risk of burning the work.

What is claimed is:

1. In a heating device, a metallic substance so arranged that its state may be changed and the heat given up in returning to its former state utilized.

2. In a heating device, a metallic substance so arranged that its state may be changed and the heat given up in returning to its former state used to supply heat to the said device.

3. In a heating device, a metallic substance so arranged that its state may be changed and the heat evolved when the substance returns to its former state utilized as a reservoir to supply heat with a pre-determined temperature range to the device as needed.

4. In a heating device, a metallic substance whose state will change at a temperature below that necessary to change the state of the material of which the heating device is constructed, said substance being so arranged that the heat given up in returning to its former state is used to supply heat to the said device.

5. In a heating device, a metallic substance so arranged that its state may be changed and the heat given up in returning to its former state utilized, and means for changing the state of the said substance.

6. In a heating device, a metallic substance so arranged that its state may be changed and the heat given up in returning to its former state utilized to supply heat to the said device, and means for changing the state of the substance.

7. A heating device comprising a body portion having a reservoir therein, a metallic substance so arranged within the reservoir that its state may be changed and the heat given up in returning to its former state utilized to supply heat to the said body portion.

8. In a heating device, a metallic substance so arranged that its state may be changed and a predetermined quantity of heat within a certain range of temperature given up in returning to its former state utilized.

9. A method of supplying heat to an implement which consists in changing the state of a metallic substance and utilizing the heat given up by said substance in returning to its former state to maintain the implement at a substantially constant temperature.

10. In a heating device, a metallic substance so arranged that its so-called latent heat may be utilized.

11. In a heating device, a metallic substance so arranged that its state may be changed and the heat given up in returning to its former state utilized to supply heat to the said device, and electric means for changing the state of the substance.

12. A heating device comprising a body portion, a metallic substance contained therein, said substance so arranged that its state may be changed and the heat given up in returning to its former state utilized to supply heat to the said body portion, and means carried by the body portion for changing the state of the said substance.

13. A heating device comprising a body portion, a metallic substance contained therein, said substance so arranged that its state may be changed and the heat given up in returning to its former state utilized to supply heat to the body portion, and electric means carried by the body portion for changing the state of the substance.

14. A heating device comprising a body portion having a reservoir therein, a metallic substance within the reservoir, said substance so arranged that its state may be changed and the heat given up in returning to its former state utilized to supply heat to the body portion, and means carried by the body portion for changing the state of the said substance.

15. A flat-iron comprising a base having a reservoir formed therein, a metallic substance within the reservoir so arranged that its state may be changed and the heat given up in returning to its former state used to supply heat to the iron.

16. A flat-iron comprising a base having a reservoir therein, a metallic substance within the reservoir so arranged that its state may be changed and the heat given up in returning to its former state used to supply heat to the iron, and heating means adjacent the metallic substance for changing its state.

17. A flat-iron comprising a base having a reservoir therein, a metallic substance within the reservoir so arranged that its state may be changed and the heat given up in returning to its former state utilized to supply heat to the said iron, and electric heating means carried by the base for changing the state of the said substance.

18. A flat-iron comprising a body portion, a metallic substance contained therein, said substance so arranged that its state may be changed and the heat given up in returning to its former state utilized, and means carried by the body portion for changing the state of the said substance.

19. A heating device comprising a body portion, a substance therein, said substance so arranged that its state may be changed and the heat given up in returning to its former state utilized, and means carried by said body portion for changing the state of said substance.

20. In a heating device, a substance so arranged that its state may be changed and the heat given up in returning to its former state utilized to supply heat to the body portion, and electric means for changing the state of the substance.

21. A heating device comprising a body portion, a substance contained therein, said substance so arranged that its state may be changed and the heat given up in returning to its former state utilized to supply heat to the body portion, and electric means carried by the body portion for changing the state of the substance.

In witness whereof, I hereunto subscribe my name this 7th day of November A. D., 1919.

JOHN JOHNSTON.